(12) United States Patent
Heath et al.

(10) Patent No.: US 12,175,852 B2
(45) Date of Patent: *Dec. 24, 2024

(54) REMOTE DISTRESS MONITOR

(71) Applicant: The Quantum Group, Inc., Greenacres, FL (US)

(72) Inventors: Chester A. Heath, Boca Raton, FL (US); Noel J. Guillama, Wellington, FL (US)

(73) Assignee: The Quantum Group, Inc., Greenacres, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/527,647

(22) Filed: Dec. 4, 2023

(65) Prior Publication Data

US 2024/0105041 A1 Mar. 28, 2024

Related U.S. Application Data

(63) Continuation of application No. 18/105,986, filed on Feb. 6, 2023, now Pat. No. 11,875,658, which is a
(Continued)

(51) Int. Cl.
*G08B 21/02* (2006.01)
*G10L 15/02* (2006.01)
(Continued)

(52) U.S. Cl.
CPC .............. *G08B 21/02* (2013.01); *G10L 15/02* (2013.01); *G10L 25/51* (2013.01); *H04R 1/406* (2013.01); *G10L 2015/025* (2013.01)

(58) Field of Classification Search
CPC .............. G08B 21/02; G08B 21/0469; G08B 21/0476; G08B 21/043; G10L 15/02;
(Continued)

(56) References Cited

U.S. PATENT DOCUMENTS

| 4,091,366 A | * | 5/1978 | Lavallee | G08B 25/10 340/539.1 |
| 5,995,553 A | * | 11/1999 | Crandall | G08B 25/085 375/272 |

(Continued)

FOREIGN PATENT DOCUMENTS

FR 2968815 A1 * 6/2012 ............. G08B 21/02

OTHER PUBLICATIONS

Audio based Surveillance (Year: 2009).
(Continued)

*Primary Examiner* — Mohammad K Islam
(74) *Attorney, Agent, or Firm* — Nixon Peabody LLP (57) ABSTRACT

A remote distress monitor includes a steerable microphone array, a memory, and a control system. The steerable microphone array is configured to detect audio data and generate sound data. The memory stores machine-readable instructions. The control system includes one or more processors configured to execute the machine-readable instructions. The generated sound data from the steerable microphone array is analyzed. Based at least in part on the analysis, a token associated with the audio data detected by the steerable microphone array is generated. The audio data is representative of one or more sounds associated with a distress event. The generated token is transmitted, via a communications network, to an electronic device to cause a distress response action to occur. The distress response action is associated with the distress event.

20 Claims, 8 Drawing Sheets

Related U.S. Application Data continuation of application No. 16/899,535, filed on Jun. 11, 2020, now Pat. No. 11,605,279.

(60) Provisional application No. 62/860,289, filed on Jun. 12, 2019.

(51) Int. Cl.
  *G10L 25/51* (2013.01)
  *H04R 1/40* (2006.01)

(58) Field of Classification Search
  CPC ... G10L 25/51; G10L 25/66; G10L 2015/025; G10L 2015/088; H04R 1/406; H04R 2201/401
  See application file for complete search history.

(56) References Cited

U.S. PATENT DOCUMENTS

| | | | | |
|---|---|---|---|---|
| 8,885,639 | B1* | 11/2014 | Robbins | H04M 7/006 |
| | | | | 379/88.13 |
| 10,825,318 | B1* | 11/2020 | Williams | G08B 21/0484 |
| 2004/0257210 | A1* | 12/2004 | Chen | G08B 25/016 |
| | | | | 340/539.18 |
| 2011/0156898 | A1* | 6/2011 | Taillefer | G08B 25/016 |
| | | | | 340/539.11 |
| 2013/0278631 | A1* | 10/2013 | Border | G06Q 30/02 |
| | | | | 345/633 |
| 2013/0339019 | A1* | 12/2013 | Giancarlo | G10L 15/04 |
| | | | | 704/251 |
| 2017/0125034 | A1* | 5/2017 | Kakadiaris | G06F 3/165 |
| 2017/0193180 | A1* | 7/2017 | Kusens | G08B 21/02 |
| 2017/0374192 | A1* | 12/2017 | Gersten | H04N 5/772 |
| 2018/0040223 | A1* | 2/2018 | Bodi | G08B 21/18 |
| 2018/0325469 | A1* | 11/2018 | Fountaine | G06Q 50/22 |
| 2019/0095586 | A1* | 3/2019 | McBrady | G16H 40/63 |
| 2019/0139390 | A1* | 5/2019 | Kawazu | G08B 21/043 |
| 2019/0147721 | A1* | 5/2019 | Avitan | G06F 1/3209 |
| | | | | 340/573.1 |
| 2021/0234953 | A1* | 7/2021 | Bracken | G08B 21/0469 |

OTHER PUBLICATIONS

Advance Integration of multimedia assistive technology (Year: 2014).

Emergency Fall Incident Detection in Assisted Living Environment (Year: 2011).

* cited by examiner

REMOTE DISTRESS MONITOR

CROSS-REFERENCE TO RELATED APPLICATIONS

This application is a continuation of U.S. application Ser. No. 18/105,986, filed Feb. 6, 2023, which is a continuation of U.S. application Ser. No. 16/899,535, filed Jun. 11, 2020, issued as U.S. Pat. No. 11,605,279 on Mar. 14, 2023, which claims priority to and the benefit of U.S. Provisional Patent Application No. 62/860,289, filed on Jun. 12, 2019, which is hereby incorporated by reference herein in its entirety.

TECHNICAL FIELD

This disclosure relates generally to systems and methods for monitoring distress, and more particularly, to systems and methods for monitoring acoustic artifacts of distress.

BACKGROUND

A particular challenge in the fields of medicine and, indeed, healthcare generally is monitoring the increasing number of older and infirm patients, who do not have the capacity, or ability to call for health care intervention in emergencies and distress situations. They cannot call for help on their own. Yet, these patients often have a higher probability of distress and catastrophic outcome. One solution has always been human monitoring, by medical personnel or others, including living partners, who can observe indications of distress and alert for intervention. Among the critical patients, those who have living partners or other forms of monitoring have much higher probabilities of survival in emergencies, and consequent longer life spans.

However, an increasing number of patients are living alone, or residing in assisted living situations where the limited staff is unable to rapidly observe indications of distress, or monitoring is simply not cost effective. Wearable devices, may create distress alerts, but only if they are worn and there is some form of sensory input, for example a heart monitor. If it is detached, it doesn't matter how good it used to be.

Thus, a need exists for an ideal monitor would detect indications of distress, without a requirement for (i) any wearable or intrusive device, or (ii) any continuous human observation. The ideal monitor would also be inexpensive and be capable of detecting a wide range of distress situations, specifically where the individual in distress is unable to call for help on their own using existing forms of communication. Further, the ideal monitor would not only monitor, but also guard against potential invasions of privacy, or violations of HIPPA protections for patient privacy. The present disclosure is directed to solving these problems and addressing other needs.

SUMMARY

According to some implementations of the present disclosure, remote distress monitor includes a steerable microphone array, a memory, and a control system. The steerable microphone array is configured to detect audio data and generate sound data. The memory stores machine-readable instructions. The control system includes one or more processors configured to execute the machine-readable instructions. The generated sound data from the steerable microphone array is analyzed. Based at least in part on the analysis, a token associated with the audio data detected by the steerable microphone array is generated. The audio data is representative of one or more sounds associated with a distress event. The generated token is transmitted, via a communications network, to an electronic device to cause a distress response action to occur. The distress response action is associated with the distress event.

In some implementations, the steerable microphone array is physically fixed relative to a housing of the remote distress monitor. In some implementations, the steerable microphone array, the memory, and the control system are at least partially positioned within a housing of the remote distress monitor.

In some implementations, the steerable microphone array includes a plurality of microphones and an adaptive amplitude and phasing circuit. In some such implementations, the adaptive amplitude and phasing circuit of the steerable microphone array is configured to generate the sound data based at least in part on adjusting an amplitude of the audio data, a phase of the audio data, or both.

In some implementations, the electronic device is a third party server, an emergency call center, or a third party's mobile device. In some implementations, the electronic device includes a speaker of the remote distress monitor. In some such implementations, the distress response action includes playing a sound stream on the speaker, and wherein the sound stream corresponds to a verbal response for the distress event. In some implementations, the verbal response for the distress event is associated with a feedback confirming a request for assistance is needed for the distress event.

In some implementations, the electronic device is external to the remote distress monitor. In some such implementations, the control system is further configured to transmit, via the communications network, the generated token to the electronic device. In some such implementations, the generated sound data from the steerable microphone array is not transmitted to the electronic device.

In some implementations, predetermined distress sound library data is received from a distress sound subset of a library. The predetermined distress sound library data includes a plurality of predetermined sounds associated with stored distress events. The generated sound data from the steerable microphone array is compared to the received predetermined distress sound library data.

In some implementations, predetermined phoneme library data is received from a phoneme subset of a library. The predetermined phoneme library data includes a plurality of predetermined sounds associated with stored names or words. Based at least in part on the analyzing the generated sound data from the steerable microphone array, the generated token is converted to a name or word. The converted token is compared to the received predetermined phoneme library data. The electronic device is then caused to execute the distress response action based at least in part on the comparison.

In some implementations, the distress response action includes (i) recording an IP address associated with a location of the steerable microphone array, (ii) displaying the location of the steerable microphone array, (iii) recording subsequent audio data detected by the steerable microphone array, (iv) recording subsequent sound data generated by the steerable microphone array, (v) dispatching an intervention, (vi) creating a potential mitigating response, or (vii) any combination thereof.

In some implementations, the one or more sounds associated with a distress event include a gurgle, a wheeze, a cry, a moan, a screen, a bark, a squak, a hiss, a boom, a fire crackle, a wind howl, a tornad, or any combination thereof.

According to some implementations of the present disclosure, a method for remote distress monitoring is disclosed. Sound data generated by a steerable microphone array is analyzed. Based at least in part on the analysis, a token associated with audio data detected by the steerable microphone array is generated. The audio data is representative of one or more sounds associated with a distress event. The generated token is transmitted, via a communications network, to an electronic device to cause a distress response action to occur. The distress response action is associated with the distress event.

The foregoing and additional aspects and implementations of the present disclosure will be apparent to those of ordinary skill in the art in view of the detailed description of various embodiments and/or implementations, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

While the present disclosure is susceptible to various modifications and alternative forms, specific implementations have been shown by way of example in the drawings and will be described in further detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

The present disclosure is described with reference to the attached figures, where like reference numerals are used throughout the figures to designate similar or equivalent elements. The figures are not drawn to scale, and are provided merely to illustrate the instant disclosure. Several aspects of the disclosure are described below with reference to example applications for illustration.

The present disclosure is related to the fields of healthcare monitoring and distress detection, classification, recording, and response. In some implementations, the present disclosure further relates to remote monitoring of humans, animals, and/or machinery, by analysis and detection of symptoms of immanent distress and relaying evidence of the event to a central point of control, for recording and response. One objective of the present disclosure is to detect distress events without requirement for wearable or intrusive devices, and can operate in an area of secure medical data containment (e.g., HIPPA-compliant).

In some implementations, the present disclosure is directed to systems and methods for detecting acoustic artifacts of distress or other potential emergency situations. For example, a person may be choking, where the gurgles, whines, and/or moans would be ready alerts to human monitoring, but are not vocalized as speech. An animal in distress might produce similar sounds, or emit a cry that a human would perceive as distress related, but the animal is incapable of vocalizing beyond that. Even a piece of machinery, may create vibrations, squeals in bearings or belts, sounds of running water, and/or the hiss of escaping steam or air.

Figure 1:
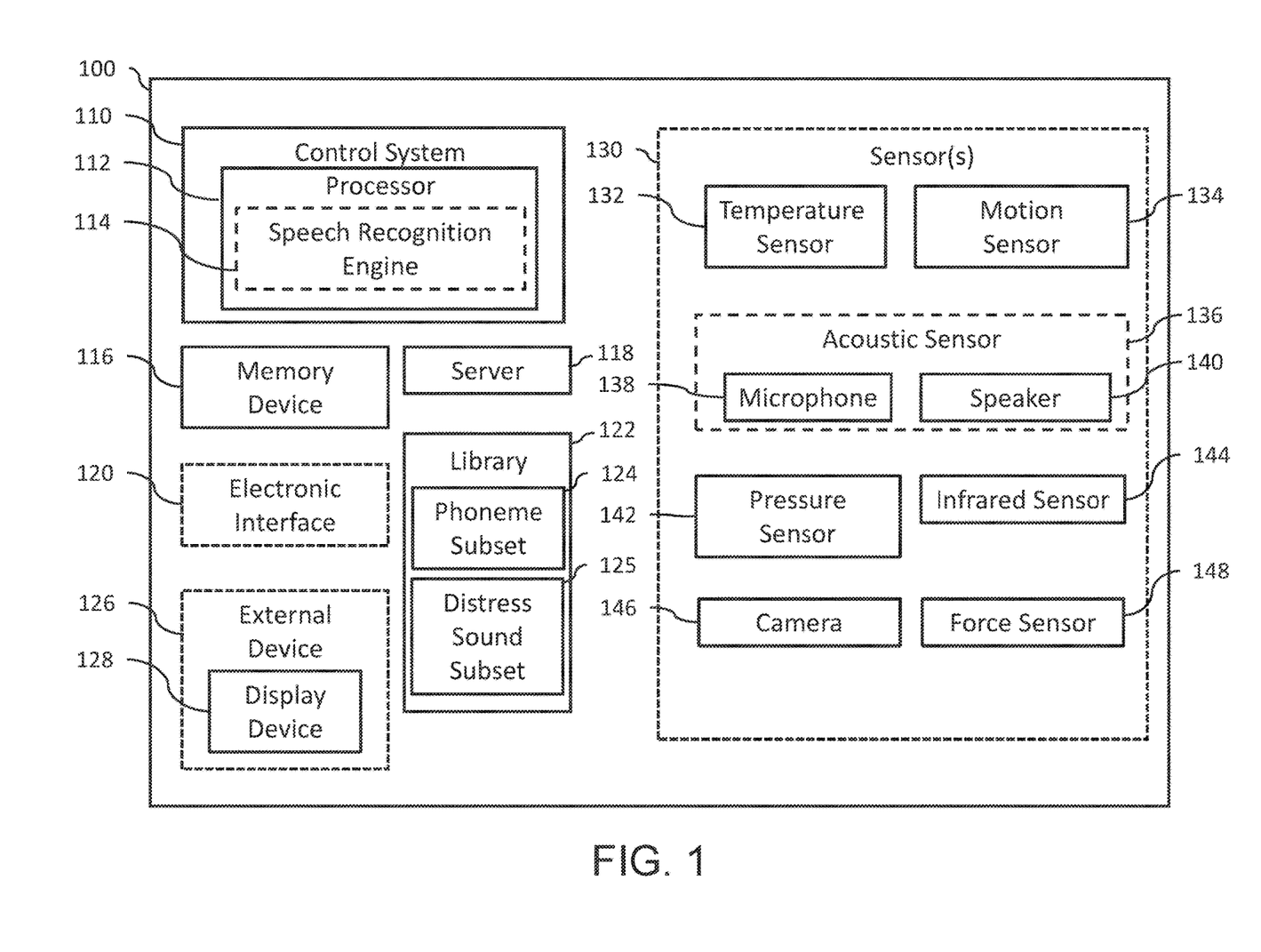
FIG. 1 is a functional block diagram of a system, according to some implementations of the present disclosure.

Referring to FIG. 1, a functional block diagram of a system 100 is shown, according to some implementations of the present disclosure. In some implementations, one or more components of the system 100 together make up a remote distress monitor described herein. The system 100 includes a control system 110, a memory device 116, a server 118, and one or more sensors 130. In some implementations, the system 100 further includes an electronic interface 120 and/or one or more external devices 126 (e.g., user devices). In some such implementations, the external device 126 further includes a display device 128. In some implementations, the server 118 includes and/or is communicatively coupled to, a library 122. In some such implementations, the library 122 includes a phoneme subset 124 (e.g., a phoneme library) and/or a distress sound subset 125 (a distress sound library).

The control system 110 includes one or more processors 112 (hereinafter, processor 112). The control system 110 is generally used to control the various components of the system 100 and/or analyze data obtained and/or generated by the components of the system 100. The processor 112 can be a general or special purpose processor or microprocessor. In some implementations, the control system 110 further includes a speech recognition engine 114. In some such implementations, the speech recognition engine 114 is the same as, or similar to, one or more processors 112. In some other implementations, the speech recognition engine 114 is separate and distinct from the one or more processors 112.

While one processor 112 is shown in FIG. 1, the control system 110 can include any suitable number of processors (e.g., one processor, two processors, five processors, ten processors, etc.) that can be in a single housing, or located remotely from each other. The control system 110 can be coupled to and/or positioned within, for example, a housing of the server 118, a housing of the external device 126, within a housing of one or more of the sensors 130, or any combination thereof. The control system 110 can be centralized (within one such housing) or decentralized (within two or more of such housings, which are physically distinct). In such implementations including two or more housings containing the control system 110, such housings can be located proximately and/or remotely from each other.

The memory device 116 stores machine-readable instructions that are executable by the processor 112 and/or the speech recognition engine 114 of the control system 110. The memory device 116 can be any suitable computer readable storage device or media, such as, for example, a random or serial access memory device, a hard drive, a solid state drive, a flash memory device, etc. While one memory device 116 is shown in FIG. 1, the system 100 can include any suitable number of memory devices 116 (e.g., one memory device, two memory devices, five memory devices, ten memory devices, etc.). The memory device 116 can be coupled to and/or positioned within a housing of the server 118, a housing of the external device 126, within a housing of one or more of the sensors 130, or any combination thereof. Like the control system 110, the memory device 116 can be centralized (within one such housing) or decentralized (within two or more of such housings, which are physically distinct).

In some implementations, the memory device 116 stores a user profile associated with the user. The user profile can include, for example, demographic information associated with the user, biometric information associated with the user, medical information associated with the user, self-reported user feedback, health parameters associated with the user, or any combination thereof.

The demographic information can include, for example, information indicative of an age of the user, a gender of the user, a race of the user, a family history, an employment status of the user, an educational status of the user, a socioeconomic status of the user, or any combination thereof. The medical information can include, for example, including indicative of one or more medical conditions associated with the user, medication usage by the user, or both.

The medical information data can further include a self-reported subjective health score (e.g., poor, average, excellent), a self-reported subjective health status of the user, a self-reported subjective stress level of the user, a self-reported subjective fatigue level of the user, a recent life event experienced by the user, or any combination thereof. In some implementations, the memory device 116 stores media content that can be displayed on the display device 128.

The electronic interface 120 is configured to receive data (e.g., physiological data) from the one or more sensors 130 such that the data can be stored in the memory device 116 and/or analyzed by the processor 112 of the control system 110. The electronic interface 120 can communicate with the one or more sensors 130 using a wired connection or a wireless connection (e.g., using an RF communication protocol, a WiFi communication protocol, a Bluetooth communication protocol, an IR communication protocol, over a cellular network, over any other optical communication protocol, etc.). In some implementations, the electronic interface 120 can include an antenna, a receiver (e.g., an RF receiver), a transmitter (e.g., an RF transmitter), a transceiver, or any combination thereof.

In some implementations, the electronic interface 120 can also include one more processors and/or one more memory devices that are the same as, or similar to, the processor 112 and the memory device 116 described herein. In some implementations, the electronic interface 120 is coupled to or integrated in the external device 126. In other implementations, the electronic interface 120 is coupled to or integrated (e.g., in a housing) with the control system 110 and/or the memory device 116.

As shown in FIG. 1, the one or more sensors 130 of the system 100 include a temperature sensor 132, a motion sensor 134, an acoustic sensor 136, a microphone 138, a speaker 140, a pressure sensor 142, an infrared sensor 144, a camera 146, a force sensor 148, or any combination thereof. Generally, each of the one or more sensors 130 is configured to output sensor data that is received and stored in the memory device 116 or one or more other memory devices.

While the one or more sensors 130 are shown in FIG. 1 and described as including each of the temperature sensor 132, the motion sensor 134, the acoustic sensor 136, the microphone 138, the speaker 140, the pressure sensor 142, the infrared sensor 144, the camera 146, and the force sensor 148, more generally, the one or more sensors 130 can include any combination and any number of each of the sensors described and/or shown herein. While shown separately in FIG. 1, any combination of the one or more sensors 130 can be integrated in and/or coupled to any one or more of the components of the system 100, including the control system 110 and/or the external device 126.

The temperature sensor 132 outputs temperature data that can be stored in the memory device 116 and/or analyzed by the processor 112 of the control system 110. The temperature sensor 132 can generate temperatures data indicative of a health status of a user, such as a core body temperature of the user a skin temperature of the user, an ambient temperature, or any combination thereof.

The motion sensor 134 outputs motion data that can be stored in the memory device 116 and/or analyzed by the processor 112 of the control system 110. The motion sensor 134 can be used to detect movement of the user when the user is nearby, and/or detect movement of any of the components of the system 100 (such as the external device 126 or one or more other sensors 130). The motion sensor 134 can include one or more inertial sensors, such as accelerometers, gyroscopes, and magnetometers.

In some implementations, the motion sensor 134 can generate one or more signals representing bodily movement of the user, from which may be obtained a signal representing an emergency of the user. In some implementations, the motion data from the motion sensor 134 can be used in conjunction with additional data from another sensor 130 to determine the health status of the user.

The microphone 138 outputs sound data that can be stored in the memory device 116 and/or analyzed by the processor 112 of the control system 110. The microphone 138 can be used to record sound(s) while the user is nearby to determine (e.g., using the control system 110) one or more health-related parameters (e.g., sounds of distress), as described in further detail herein. In some implementations, the system 100 includes a plurality of microphones (e.g., two or more microphones and/or an array of microphones) such that sound data generated by each of the plurality of microphones can be used to discriminate the sound data generated by another of the plurality of microphones and/or determine a position/location/direction of a sound of interest.

The speaker 140 outputs sound waves that are from speaker data stored in the memory device 116 and/or generated by the processor 112 of the control system 110. In one or more implementations, the sound waves can be audible to a user of the system 100 or inaudible to the user of the system (e.g., ultrasonic sound waves). The speaker 140 can be used, for example, to generate an alert and/or a message (e.g., in response to an event) to the user or someone affiliated with the user. In some implementations, the microphone 138 and the speaker 140 can be used as separate devices. In some other implementations, the microphone 138 and the speaker 140 can be combined into the acoustic sensor 136.

The pressure sensor 142 outputs pressure data that can be stored in the memory device 116 and/or analyzed by the processor 112 of the control system 110. The pressure sensor 142 can be, for example, a capacitive sensor, an electromagnetic sensor, an inductive sensor, a resistive sensor, a piezoelectric sensor, a strain-gauge sensor, an optical sensor, a potentiometric sensor, or any combination thereof.

The infrared sensor 144 outputs infrared image data reproducible as one or more infrared images (e.g., still images, video images, or both) that can be stored in the memory device 116. The infrared data from the Infrared sensor 144 can be used to determine one or more health-related parameters associated with the user, including a temperature of the user and/or movement of the user. In some implementations, the Infrared sensor 144 can also be used in conjunction with the camera 146 when measuring the presence, location, and/or movement of the user.

The camera 146 outputs image data reproducible as one or more images (e.g., still images, video images, thermal images, or a combination thereof) that can be stored in the memory device 116. The image data from the camera 146 can be used by the control system 110 to determine one or more of the health-related parameters described herein The image data from the camera 146 can be used by the control system 110 to determine one or more of the health-related parameters described herein, such as, for example, one or more emeruency events. Further, in some implementations, the image data from the camera 146 can be used to identify a location of the user and/or an identity of the user.

The force sensor 148 outputs data that can be stored in the memory device 116 and used by the control system 110 to determine one or more of the health-related parameters described herein.

As disclosed herein, in some implementations, the external device 126 includes the display device 128. The external device 126 can be, for example, a mobile device such as a smart phone, a tablet, a laptop, or the like. Alternatively, the external device 126 can be an external sensing system, a television (e.g., a smart television) or another smart home device. In some implementations, the user device is a wearable device (e.g., a smart watch).

The display device 128 is generally used to display image(s) including still images, video images, or both. In some implementations, the display device 128 acts as a human-machine interface (HMI) that includes a graphic user interface (GUI) configured to display the image(s) and an input interface. The display device 128 can be an LED display, an OLED display, an LCD display, or the like. The input interface can be, for example, a touchscreen or touch-sensitive substrate, a mouse, a keyboard, or any sensor system configured to sense inputs made by a human user interacting with the external device 126.

While the control system 110 and the memory device 116 are described and shown in FIG. 1 as being a separate and distinct component of the system 100, in some implementations, the control system 110 and/or the memory device 116 are integrated in the external device 126 and/or a smart home device. Alternatively, in some implementations, the control system 110 or a portion thereof (e.g., the processor 112) can be located in a cloud (e.g., integrated in the server 118, integrated in an Internet of Things (IoT) device, connected to the cloud, be subject to edge cloud processing, etc.), located in one or more servers (e.g., remote servers, local servers, etc., or any combination thereof.

While system 100 is shown as including all of the components described above, more or fewer components can be included in a system for remote distress monitoring, according to implementations of the present disclosure. For example, a first alternative system includes the control system 110, the memory device 116, the library 122, and at least one of the one or more sensors 130. As another example, a second alternative system includes the control system 110, the memory device 116, at least one of the one or more sensors 130, and the external device 126. Thus, various systems for implementing the present disclosure can be formed using any portion or portions of the components shown and described herein and/or in combination with one or more other components.

Figure 2:
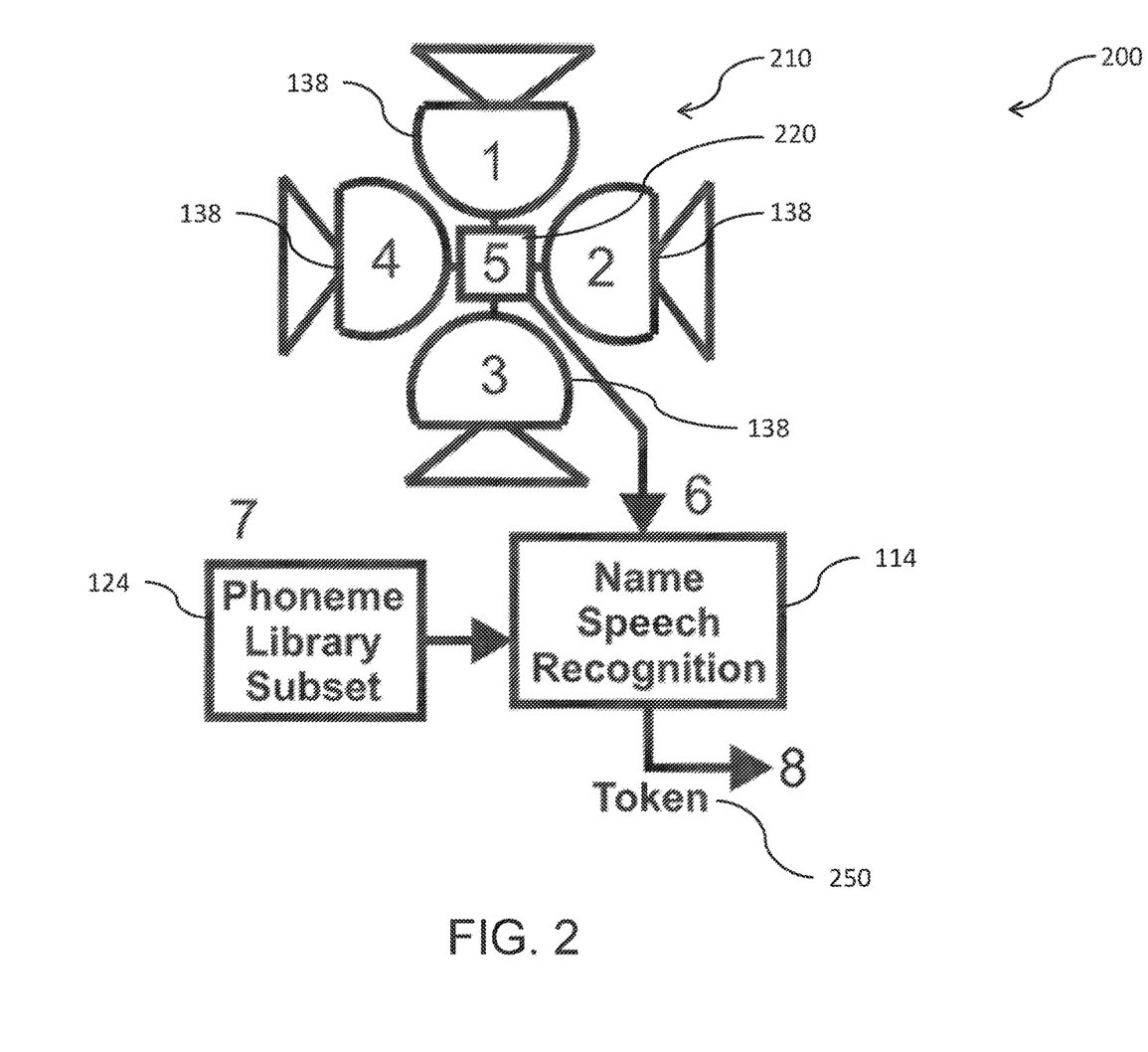
FIG. 2 is an illustrative diagram of a remote distress monitor that incorporates at least a portion of the system of FIG. 1, according to some implementations of the present disclosure.

Referring to FIG. 2, an illustrative diagram of a remote distress monitor 200 is shown, which incorporates at least a portion of the system of FIG. 1, according to some implementations of the present disclosure. Thus, in some implementations, the system 100 (FIG. 1) can be implemented in the remote distress monitor 200 to detect sounds of distress, with or without any verbally articulated names or words. For example, the system 100 (FIG. 1) can be configured to detect the low frequency thud of a person falling down, unconscious moans of pain, a gurgle of a person with internal injuries/bleeding, COPD, and/or wheezing that can block airflow and speech.

As shown, a steerable microphone array 210 includes four microphones 138 of the system 100. In some implementations, the steerable microphone array 210 further includes an adaptive amplitude and phasing circuit 220 (e.g., in an analog processing unit and/or the processor 112 of the system 100), which is configured to adjust an amplitude and/or a phase of sounds detected by the microphones 138 and/or sound data generated by the microphones 138. In some implementations, one or more of the four microphones 138 include the adaptive amplitude and phasing circuit 220. In some implementations, the adaptive amplitude and phasing circuit 220 is a separate and distinct component from the microphones 138.

In some implementations, the four microphones 138 and the adaptive amplitude and phasing circuit 220 operate together to localize the sound of a voice, for maximum clarity. Although it is shown in FIG. 2 that the steerable microphone array 210 includes four microphones 138, the steerable microphone array 210 can include more or fewer microphones, such as two microphones, three microphones, five microphones, ten microphones, etc. which are arranged in any suitable configuration.

A speech recognition engine (e.g., the speech recognition engine 114 of the system 100) responds to a specific sequence of phonemes that are stored in a phoneme subset (e.g., the phoneme subset 124 of the system 100) of a library (e.g., the library 122 of the system 100), so as to produce a token 250 that is specific to that name and/or word sequence. In some implementations, the token 250 includes a code name, a string of numbers, a unique numeric value, or any combination thereof. For example, if the speech recognition engine 114 recognizes a sound of a gunshot, a token 250 of "1ea4" is produced as a hex 16-bit value; if the speech recognition engine 114 recognizes a sound of a cough, a token 250 of "fc67" is produced, which is distinct from the token 250 for the sound of the gunshot.

In some implementations, each token 250 is associated with a specific sound and/or a series of sounds. In some implementations, based at least in part on the generated token 250, an alert is sent to an application 330 (FIG. 3) coupled to a server (e.g., the server 118 of the system 100). An example alert includes an indication that service is requested. In some implementations, the alert is followed by a digital voice stream. For example, the digital voice stream can include words and/or sounds played by a speaker (e.g., the speaker 140 of the system 100).

In some implementations, the steerable microphone array 210 is configured to localize the detected sounds (e.g., a voice of a person, a voice of an animal, an ambient sound, a sound caused by a user's action and/or otherwise associated with the user) via the analog processing unit 220, which is configured to select the appropriate balance of amplitude and/or phase among the four microphones 138 to deliver the clearest signal to the speech recognition engine 114.

In some implementations, the processor 112 and/or the speech recognition engine 114 further includes a Name Speech Recognition Processor (NSRP). In some such implementations, the NSRP is configured to recognize a sequence of phonemes based on, for example, comparing the sound data from the microphone(s) 138 to a plurality of predetermined sounds that are associated with stored names and/or words in a phoneme subset 124 of the library 122. In some implementations, the NSRP then issues and/or generates the token 250 for the matched name and/or word through a communications network 320 (FIG. 3).

Figure 3:
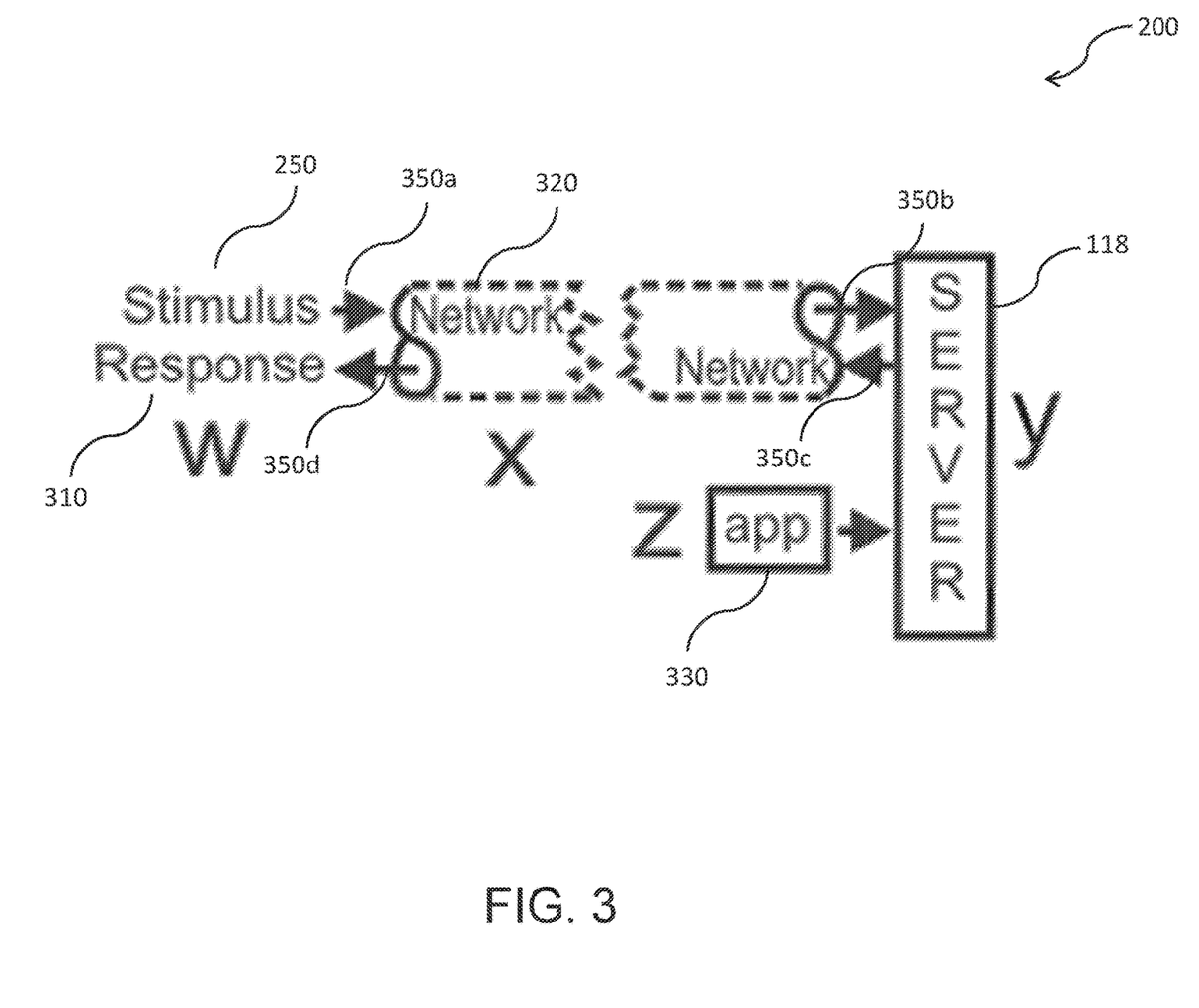
FIG. 3 is an illustrative diagram of the remote distress monitor of FIG. 2, according to some implementations of the present disclosure.

Referring now to FIG. 3, another illustrative diagram of the remote distress monitor 200 is shown, according to some implementations of the present disclosure. As shown, the generated token 250 (now acting as a stimulus) is delivered to the server 118 via the communications network 320. Thus, in some implementations, the generated token 250 and the server 118 can establish a two-way digitally compressed sound path (350a, 350b, 350c, and 350d), via the communications network 320. In some such implementations, the two-way digitally compressed sound path (350a, 350b, 350c, and 350d) is representative of a stimulus/response relationship, where the token 250 (stimulus), as delivered over the communications network 320, is interpreted by the application 330 coupled to the server 118. Then, a corresponding response 310 is generated via the digitally compressed sound path 350c and 350d (e.g., via the server 118 and the communications network 320).

In some implementations, corresponding response 310 is a selected database response, which is generated based at least in part on comparing the sound data from the microphone(s) 138 (FIGS. 1-2) to a plurality of predetermined sounds that are associated with stored names and/or words in a phoneme subset 124 of the library 122 (FIG. 1). In some such implementations, the selected database response is then serialized and/or compressed into the digital stream (e.g., the digital voice stream described herein, instructions for further processing), which can be decoded and/or reproduced through a speaker (e.g., the speaker 140 of the system 100). In some such implementations, the speaker 140 can be coupled to and/or positioned with a housing of the steerable microphone array 210.

In some implementations, the two-way digitally compressed sound path is only established between the generated token 250 and the server 118 following a specific sound pattern received by one or more microphones 138 of the steerable microphone array 210. The specific sound pattern can include a word/phrase, a series of numbers, a musical cord, or the like. In some implementations, a plurality of sound patterns is pre-established and/or stored in the library 122, for example, in the phoneme subset 124. In some implementations, the specific sound pattern is analyzed to identify the user prior to the two-way digitally compressed sound path is established.

In some implementations, the analog processing unit 220 is configured to send the sound data from the microphone(s) 138 as a query into a database (e.g., the library 122, the phoneme subset 124 and/or the distress sound subset 125 of the system 100). Based at least in part on the information from the database, the analog processing unit 220 can recognize a specific sound pattern received by one or more microphones 138 of the steerable microphone array 210 as the specific sound pattern. In some implementations, the analog processing unit 220 only begins to interpret the remaining sound data from the microphone(s) 138 (e.g., for distress situations) following the specific sound pattern received by one or more microphones 138 of the steerable microphone array 210.

In some implementations, the remote distress monitor 200 is configured to transform various distress sounds of humans, animals, weather, and/or machinery into digital sound components for the specific sound pattern disclosed herein (e.g., the word/phrase, the series of numbers, the musical cord, or the like that aids in generating the token 250), based at least in part on detecting those various distress sounds (e.g., by the steerable microphone array 210). For example, a remote distress monitor 200 can become active in generating one or more tokens 250 upon detecting a specific name "Patrick." Additionally or alternatively, the remote distress monitor 200 is configured to transform the various distress sounds into a digital version of the specific name "Patrick." The remote distress monitor 200 can then issue and/or identify the token 250 as described herein.

Additionally or alternatively, in some implementations, the remote distress monitor 200 (via, for example, the processor 112 and/or the speech recognition engine 114) is configured to recognize various distress sounds of humans, animals, weather, and/or machinery s based on, for example, comparing the sound data from the microphone(s) 138 to a plurality of predetermined sounds that are associated with stored distress sounds in the distress sound subset 125 of the library 122. In some such implementations, the remote distress monitor 200 then issues and/or generates the token 250 for the matched distress sounds through the communications network 320.

Figure 4:
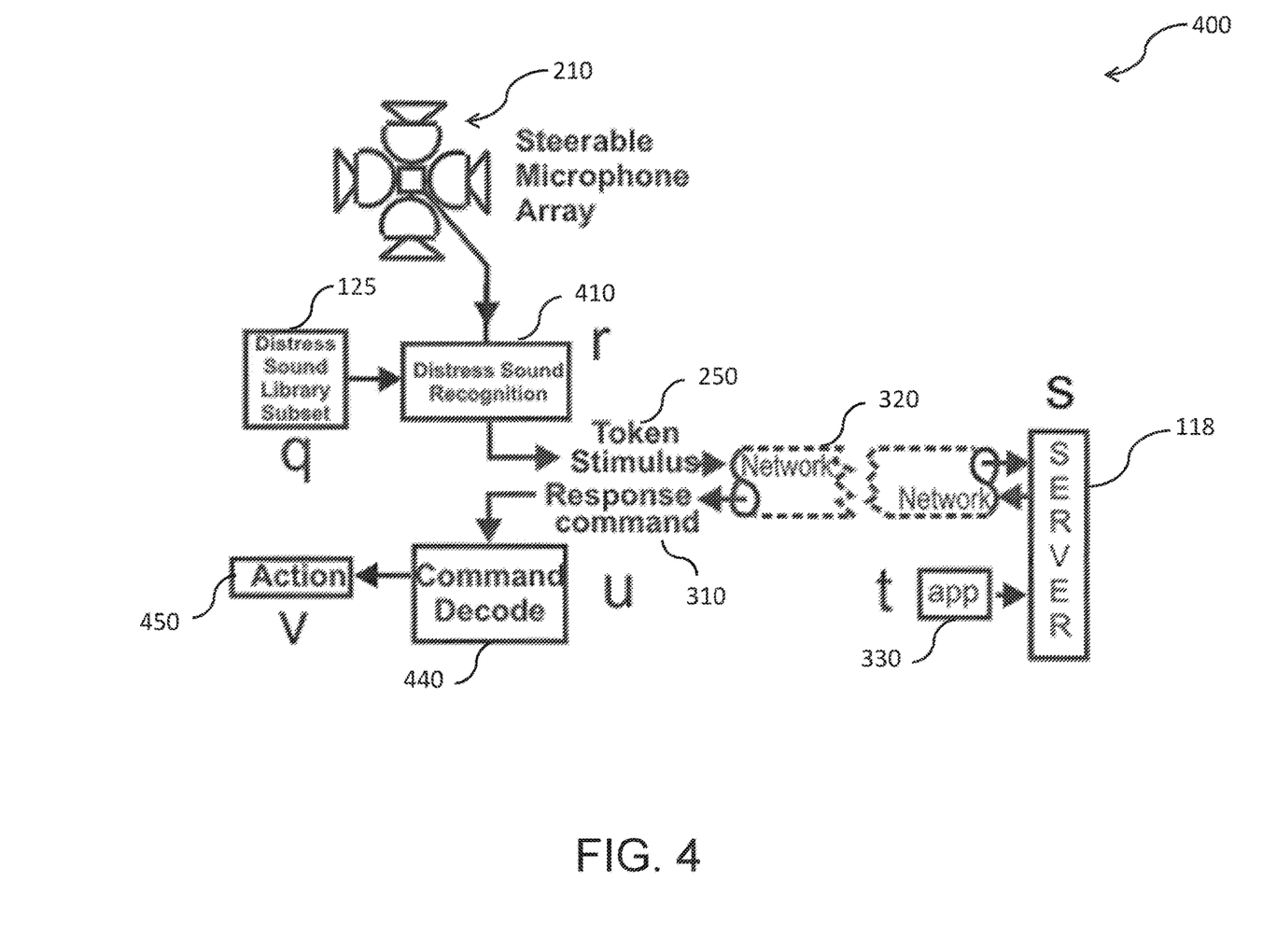
FIG. 4 is an illustrative diagram of a remote distress monitor that incorporates at least a portion of the system of FIG. 1, according to some implementations of the present disclosure.

Referring to FIG. 4, an illustrative diagram of a remote distress monitor 400 is shown, which incorporates at least a portion of the system of FIG. 1 according to some implementations of the present disclosure. In some implementations, the remote distress monitor 400 is the same as, or similar to, the remote distress monitor 200 of FIGS. 2-3, where identical reference numbers represent identical elements. As shown, the distress sound subset 125 is representative of a plurality of specific sounds of distress. Based at least in part on the stored distress sounds in the distress sound subset 125 and sound data from the steerable microphone array 210, the remote distress monitor 400 is configured to recognize the distress sounds (410).

As discussed herein, in some implementations, a recognized distress sound can be treated as a name/word for comparison to the phoneme subset 124 before a token 250 associated with the specific name/word (e.g., substituting the specific distress sound) is generated. In some implementations, the token 250 associated with the specific distress sound is generated directly after the distress sound is recognized.

The generated token 250 is transmitted to the server 118. Based at least in part on an analysis of the generated token 250, the application 330 is configured to generate and/or transmit a response 310 via the two-way digitally compressed sound path. In some implementations, the response 310 is analyzed and/or interpreted by a command decoder 440 to produce an action 450. In some such implementations, the command decoder 440 is configured to decompress and/or decode the response 310.

In some implementations, the action 450 can include (i) generating an alert of a distress situation associated with a particular IP address associated with the steerable microphone array 210, (ii) recording pertinent information (e.g., the particular IP address, a time stamp, a location of the distress situation, an identity of a user), (iii) recording subsequent sound data generated by the one or more microphones, (iv) dispatching an intervention, (v) creating a potential mitigating response, or (vi) any combination thereof. In some such implementations, the actual audio detected by the steerable microphone array 210 is not transmitted outside of the remote distress monitor 400, only the token 250 is.

In some implementations, the remote distress monitor 400 can include one or more cameras (e.g., the camera 146 of the system 100), one or more display devices (e.g., the display device 128 of the system 100), and/or one or more speakers (e.g., the speaker 140 of the system 100). A specific token 250 can trigger recording using the camera 146 (FIG. 1). Suggested responses can be displayed on the display device 128. For example, the recognized distress sound is indicative of choking (e.g., the audio detected by the steerable microphone array 210 resembles the sounds of choking). The monitored individual may be unable to speak or may become unconscious. The remote distress monitor 400 is then configured to display and/or speak instructions for intervention with the choking (e.g., to bystanders and/or to call 911).

Figure 5:
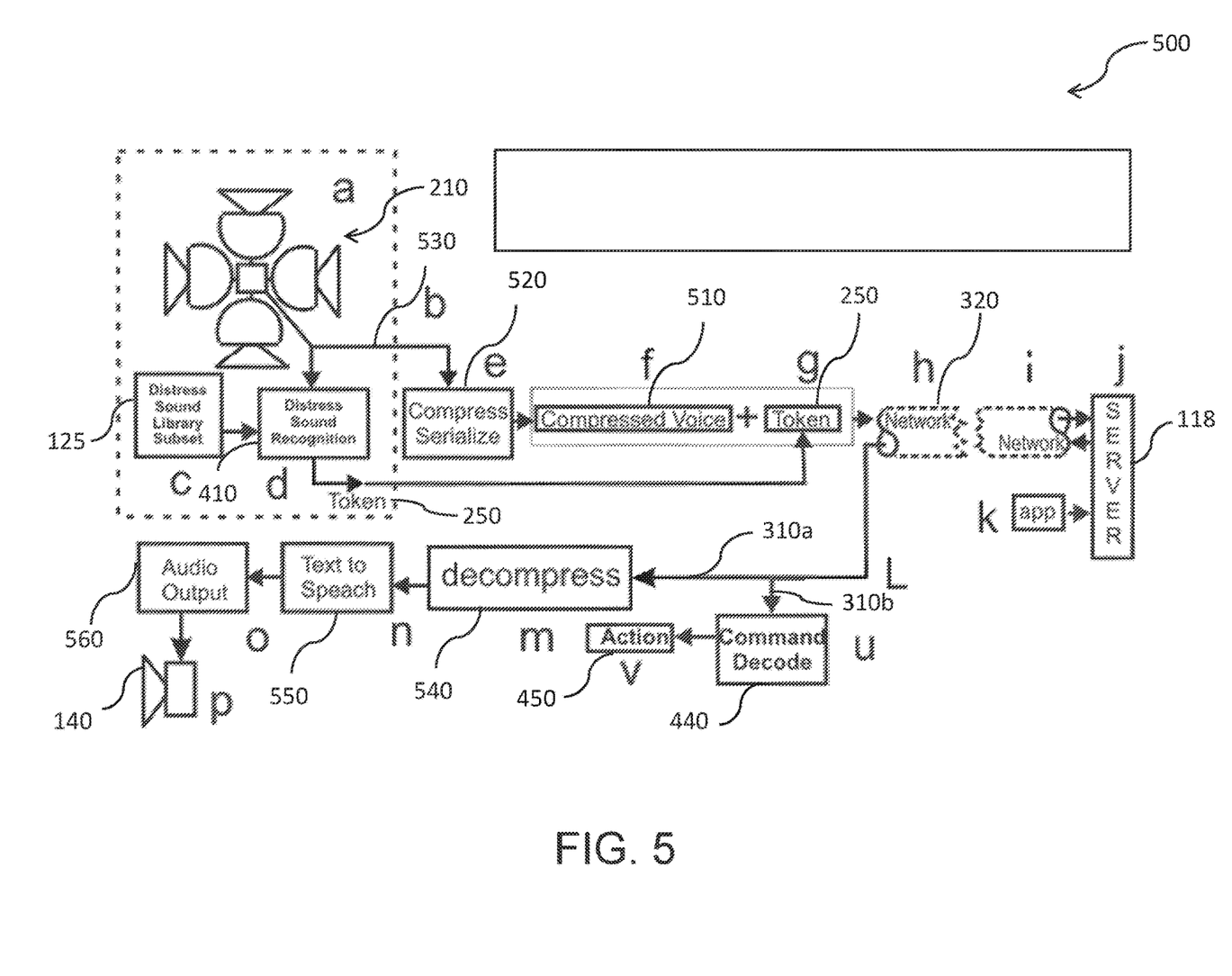
FIG. 5 is an illustrative diagram of a remote distress monitor that incorporates at least a portion of the system of FIG. 1, according to some implementations of the present disclosure.

Referring to FIG. 5, an illustrative diagram of a remote distress monitor 500 is shown, which incorporates at least a portion of the system of FIG. 1, according to some implementations of the present disclosure. In some implementations, the remote distress monitor 500 is the same as, or similar to, the remote distress monitor 200 of FIGS. 2-3 and/or the remote distress monitor 400 of FIG. 4, where identical reference numbers represent identical elements.

The steerable microphone array 210 is configured to detect audio 530 and/or generate sound data based on the detected audio 530. The sound data is processed and/or analyzed by the remote distress monitor 500 to recognize (410) a distress sound, based at least in part on the distress sound subset 125. A unique token 250 is issued, generated, and/or added as a preamble to an outbound compressed voice/sound stream 510, which is serialized and/or compressed (520) from the audio 530. The compressed voice/sound stream 510 can also include the actual distress sound (e.g., the audio 530) for further processing.

The complete packet (e.g., the compressed voice/sound stream 510+the unique token 250) is transmitted over the communications network 320 to the server 118. As shown in FIG. 5, the remote distress monitor 500 is configured to generate two responses 310a and 310b. The first response 310a proceeds to be processed by the command decoder 440 to produce a corresponding action 450. The second response 310b includes a sound stream response, which is decompressed (540). Additionally or alternatively, the second response 310b is converted to speech 550 by text to speech. The decompressed response 540 and/or the speech response 550 is transmitted to a speaker (e.g., the speaker 140 of the system 100) via audio output (560).

Figure 6:
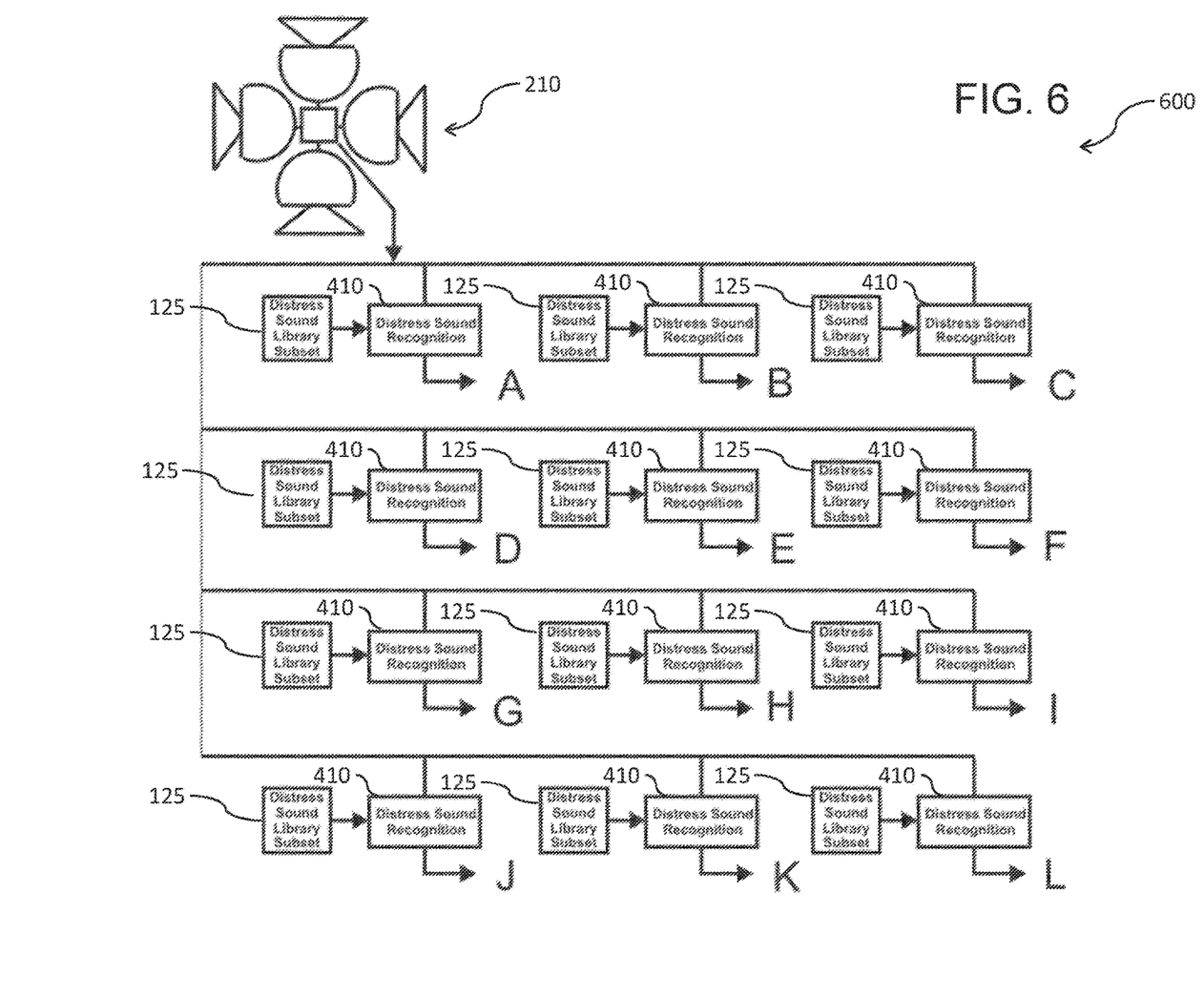
FIG. 6 is an illustrative diagram of a remote distress monitor that incorporates at least a portion of the system of FIG. 1, according to some implementations of the present disclosure.

Referring to FIG. 6, an illustrative diagram of a remote distress monitor 600 is shown, which incorporates at least a portion of the system of FIG. 1 according to some implementations of the present disclosure. In some implementations, the remote distress monitor 600 is the same as, or similar to, the remote distress monitor 200 of FIGS. 2-3, the remote distress monitor 400 of FIG. 4, and/or the remote distress monitor 500 of FIG. 5, where identical reference numbers represent identical elements.

In some implementations, the remote distress monitor 600 can include one or more modules of the remote distress monitor 500 as shown in FIG. 5. In some such implementations, the remote distress monitor 600 can include duplicates of any of the one or more modules. In some implementations, multiple distress alerts (e.g., as one or more actions 450 as shown in FIG. 5) can be created by the remote distress monitor 600. As shown in FIG. 6, for example, the steerable microphone array 210 detects a plurality of audios and/or generates a plurality of corresponding sound data. Each of the plurality of sound data is analyzed to recognize a corresponding distress sound (410), based at least in part on a separate comparison to the distress sound subset 125.

Then, each corresponding distress sound can be returned as a unique token (e.g., indicative of a gurgle, a wheeze, a cry, a moan, a screen, a bark, a squak, a hiss, a boom, a fire crackle, a wind howl, a tornado, etc.). Thus, in some implementations, the remote distress monitor 600 allows for detection of a plurality of sounds and/or words—each with a unique token.

In some implementations, the phoneme subset 124, the distress sound subset 125, and/or the tokens 250 can be loaded from an external source of the remote distress monitor of the present disclosure. In some implementations, the remote distress monitor of the present disclosure is configured to sample and/or generate data for use in the phoneme subset 124 and/or the distress sound subset 125. For example, if the sample testing reveals that a bearing may fail in a new mode, the remote distress monitor of the present disclosure is configured to create a specific sound (e.g., a digitized sound) and include it in the distress sound subset 125 for future use. As another example, a cough specific to a disease (e.g., whooping) can be added in the distress sound subset 125 when a patient is diagnosed with the disease.

In some implementations, one or more subsets of the library 122 can be cycled with specific sound libraries (e.g., one or more phoneme subsets 124, one or more distress sound subsets 125), where capacity of the remote distress monitor of the present disclosure to detect all the sounds of interest is limited.

In some implementations, an array of many thousands of the modules shown in FIG. 6 can be contained in a single remote distress monitor, thereby allowing interpretation of a combined variety of distress sounds and/or words, as a string of tokens. This would not only be useful when distress sounds are combined in a single event (e.g., thud, moan, gurgle), but also as a sequence of tokens representing concepts and/or words structured in a language. Further, implementations of the present disclosure can also useful in language interpretation and/or translation by machines.

In some implementations, each distress sound subset 125 and/or phoneme subset 124 is assigned to a corresponding element of an array, which can be individually programmed, such that the array can be customized for a given language, set of animal sounds, and/or set of machinery failure signatures. Further, in some implementations, loadable sound components can be defined, such that one or more libraries can be upgraded, patched, and/or corrected independent of each other.

Implementations of the present disclosure can be utilized in different situations beyond a fixed terrestrial system. For example, in some implementations, the remote distress monitor disclosed herein can signal mechanical and/or biological alerts in vehicles (e.g., aircraft, ships, automobiles), where humans are not present or cannot be present in a given environment, or when humans are unable to articulate a request for intervention.

In some implementations, the remote distress monitor disclosed herein can be used in a Homeland Security situation to remotely alert for intrusions and/or escapes in perimeter security (e.g., footsteps, climbing on walls, digging, cutting), or serve as a tactical remote sound monitor in military situations (e.g., to identify a specific mortar, cannon, aircraft, vehicle, or submarine sound, and use a plurality of steerable microphone arrays to locate the origin of the sound).

In some implementations, distress sounds related to weather alerts can be wind howling and/or rumbling sounds of tornadoes. In some such implementations, the one or more remote distress monitors can be un-attended and set in remote areas for warning and/or forecasting.

For example, in some implementations, the remote distress monitor disclosed herein can listen to an outboard and tell if the bearings are worn, if it is mounted incorrectly, or if it needs a new pump, by listening for unique sounds emitted from the outboard of the working machine. In some implementations, the remote distress monitor is configured to determine the make and model of the engine, and then generates, via the speaker, a digital voice stating: "replace part number 1234567a according to procedure abcdef-34." In some implementations, further analysis would occur remotely. In some implementations, the manufacturer can use a separate remote distress monitor to listen to each individual motor of a plurality of motors, and learn the distress sounds specific to each individual motor. In some implementations, the remote distress monitor can be built into the vehicle initially.

In some implementations, the remote distress monitor is configured to hear a child's cry and determine if it is serious (e.g., requires a caretaker's attention). In some implementations, the remote distress monitor can intently listen for sounds of specific illnesses and/or diseases (e.g., asthma), which would be specific to one particular person. For example, an adult with COPD only needs to take a minimum amount of medicine to extinguish a wheeze, which can be learned by the remote distress monitor for that particular adult.

In some implementations, a remote distress monitor used for weather monitoring can listen for sounds of lightning, based on, for example, previous storms; and gauge by frequency and intensity the potential of a storm. In some implementations, a remote distress monitor used for a farmer and/or a game warden can be implemented to locate errant animals by their distinctive sounds and/or detect the sound of predator animals in the vicinity of their livestock.

Thus, in some implementations, the remote distress monitor of the present disclosure provides a locally intelligent analysis of an acoustic distress sound, automatically generates a response, potentially by connectivity to a more intelligent system. In some such implementations, the remote distress monitor is a passive system, where no active participation by the monitored subject is required. Alternatively, in some implementations, the remote distress monitor is an active system, for example, where a button is employed to summon help after the remote distress monitor recognizes a distress sound.

In some implementations, one or more components (e.g., the steerable microphone array 210) of the remote distress monitor of the present disclosure is embedded inside the body of a person and/or an animal, such as adjacent to critical organs (e.g., heart, lungs) or digestive organs. Not only would such a remote distress monitor be configured to capture an inappropriate sound (e.g., atrial fibrillation) that differed from previously stored correct sounds, the remote distress monitor is also then configured to record new improper sounds and/or transmit them to a central database (e.g., one or more subsets of the library 122) for comparison to other information. In some implementations, one or more steps of the processing is done at a remote supervising monitor system.

In some implementations, the remote distress monitor of the present disclosure used for automobile monitoring can listen for sounds of a collision, such as tires squealing and/or objects colliding within the car. In some such implementations, the remote distress monitor is configured to listen for sounds of improper combustion, such as pinging, unstable running gear (e.g., worn bearings or brakes), and/or the tone of exhaust. Then, the remote distress monitor is configured to communicative with and/or notify the automobile's computer to record the observation for the next service operation.

In some implementations, the remote distress monitor of the present disclosure is configured to analyze sounds associated with gunfire (e.g., the gunfire itself, the voice of a known threatening individual, and/or sounds of violence against the body). In some such implementations, the remote distress monitor is configured to determine degrees of distortion, reverberation, and/or the relative distance of such a sound. In some such implementations, the remote distress monitor can be coupled to, positioned within, and/or a part of a bodycam for law enforcement. For example, the remote distress monitor can be configured to automatically alert for intervention on behalf of either the officer and/or those that they encounter. In some such implementations, specific spoken words, such as "help," "ambulance," "backup," or other emergency spoken sounds would yield automatic alerts by the remote distress monitor.

Figure 7:
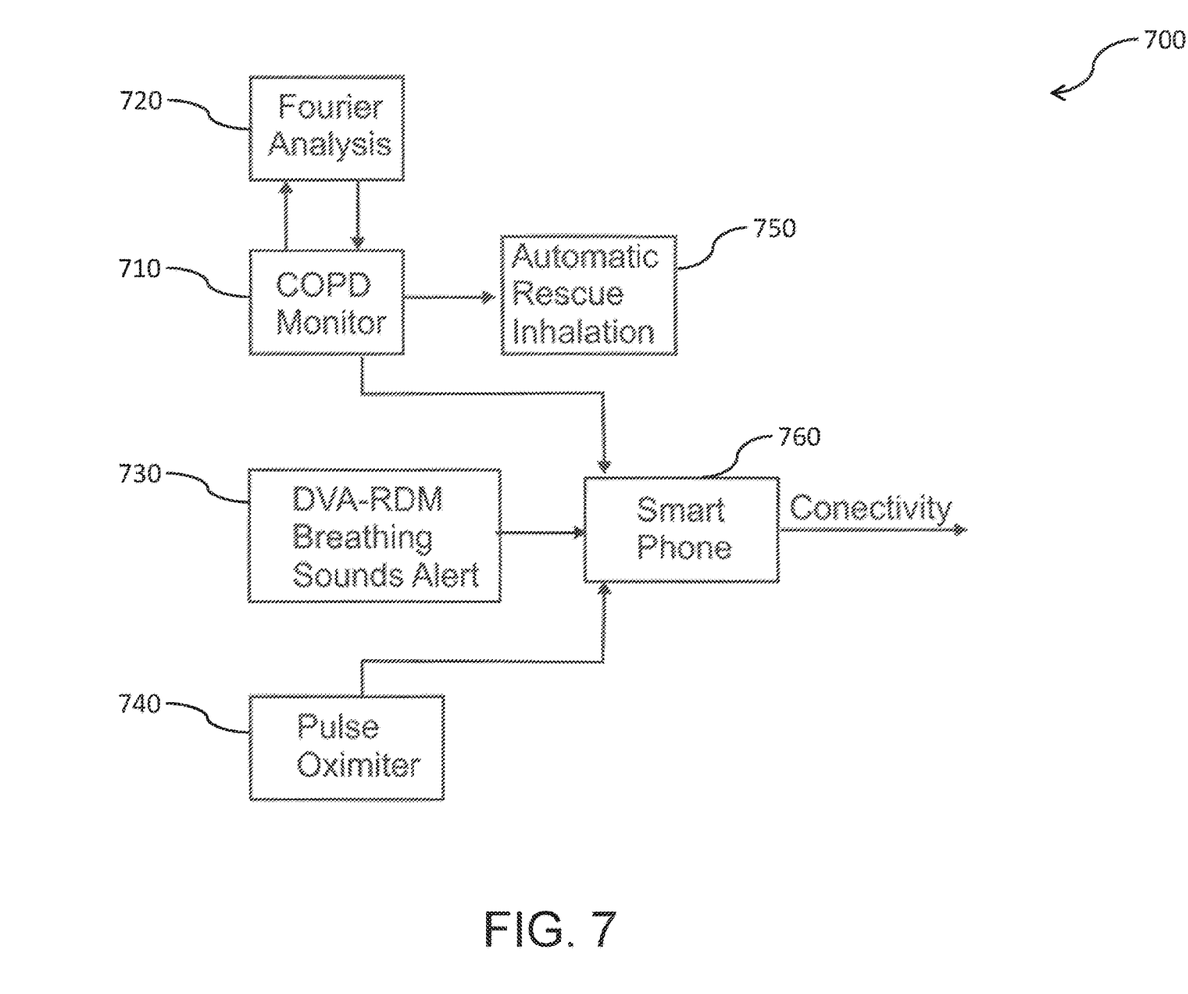
FIG. 7 is a flow diagram for an alert generated by a remote distress monitor, according to some implementations of the present disclosure.

In some implementations, when connectivity is interrupted, the sounds can also be locally analyzed for correctness and/or accuracy by a local acoustic analysis process (e.g., a mathematical Fourier analysis 720 in FIG. 7). In some implementations, the analysis process (e.g., used to create an alert) referred to herein is exemplified by the ones described in U.S. Pat. No. 10,631,757, which is hereby incorporated by reference herein in its entirety. Alternative definitions are also possible.

Referring to FIG. 7, a flow diagram 700 for an alert generated by a remote distress monitor (e.g., the remote distress monitor 200, the remote distress monitor 400, the remote distress monitor 500, the remote distress monitor 600) is shown, according to some implementations of the present disclosure. An individual with COPD may administer a measured dosage of a rescue agent to avoid a respiratory incident during sleep (e.g., before bed and/or using a drug delivery machine). A COPD monitor 710 can be used for this individual. In some implementations, the COPD monitor 710 is the same as, or similar to, any remote distress monitor disclosed herein. In some implementations, the COPD monitor 710 includes the remote distress monitor disclosed herein.

The COPD monitor 701 is configured to analyze the sound data, for example, using a Fourier analysis. In some implementations, the COPD monitor 710 automatically administers rescue inhalation 750 to the patient, when the COPD monitor 710 determines that the individual is having an attack. However, in some examples, the individual may be coughing profusely and need additional medicine in time to avoid asthmatic closure, but administering beyond the prescribed limit may trigger an alert on the drug delivery machine. Thus, the COPD monitor 710 can be configured to validate such a determination from other wearables and/or embedded devices for measuring oxygenation associated with the individual (e.g., via a pulse oximeter 740).

In some such implementations, the pulse oximeter 740 can be coupled to and/or integrated within a housing of the COPD monitor 710. Additionally or alternatively, the pulse oximeter 740 and the COPD monitor 710 communicates with each other via other devices (e.g., another remote distress monitor with cameras, screens, and/or audio; another smart device such as a smart phone 760). In some examples, the COPD monitor 710 can be further configured to validate its determinations based on other breathing sounds alert 730 generated by one or more other remote distress monitors.

Figure 8:
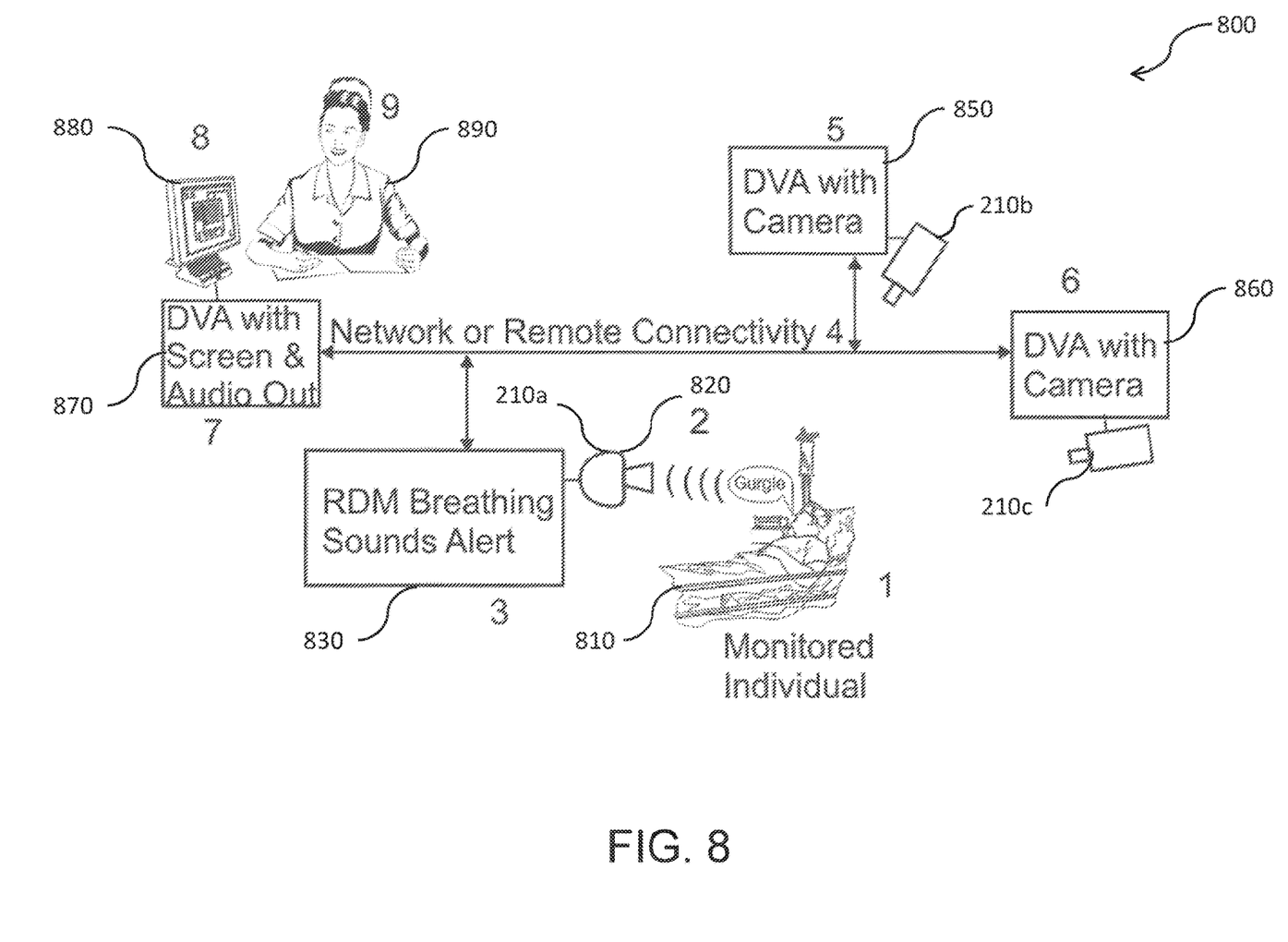
FIG. 8 is an illustrative diagram of a remote distress monitoring system, according to some implementations of the present disclosure.

Referring to FIG. 8, an illustrative diagram of a remote distress monitoring system 800 is shown, according to some implementations of the present disclosure. In some implementations, the remote distress monitor 600 can include at least a portion of one or more of the remote distress monitor 200 of FIGS. 2-3, the remote distress monitor 400 of FIG. 4, the remote distress monitor 500 of FIG. 5, and the remote distress monitor 600 of FIG. 6, where identical reference numbers represent identical elements.

A remote distress monitoring system can a plurality of steerable microphone arrays. As shown, the remote distress monitoring system 800 includes a first monitoring device 820, a second monitoring device 850, and a third monitoring device 860. In some implementations, the first monitoring device 820 includes a first steerable microphone array 210a; the second monitoring device 850 includes a second steerable microphone array 210; and the third monitoring device 860 includes a third steerable microphone array 210c.

The steerable microphone arrays can be associated with a corresponding patient and/or location of the patient. For example, the first steerable microphone array 210a is configured to detect audio (e.g., breathing sounds, a gurgle) from the individual 810 being monitored. In some implementations, based at least in part on the detected audio, sound data associated with the individual 810 is generated by the first steerable microphone array 210a. In some implementations, a token can be generated based at least in part on analyzing the generated sound data, as described herein. Additionally or alternatively, an alert 830 is generated based at least in part on analyzing the sound data generated by the first steerable microphone array 210a, and/or analyzing the token. The alert 830 can be indicative of the breathing sounds of the individual 810.

A monitoring personnel 890 (e.g., healthcare personnel in a hospital setting, a caretaker for the geriatric) can receive the token and/or the alert 830 associated with the individual 810, via a monitoring device 870. In some implementations, the monitoring device 870 includes a display device (e.g., the display device 128 of the system 100) and/or a speaker (e.g., the speaker 140 of the system 100). Further, in some implementations, the monitoring personnel 890 can receive similar or additional information associated with the second monitoring device 850 and/or the third monitoring device 860. In some such implementations, one or more processing steps are the same as, or similar to, what is described with reference to FIG. 6.

In some implementations, the monitoring device 820, the second monitoring device 850, the monitoring device 860, and/or the master monitoring device 870 is the same as, or similar to, the external device 126 of the system 100. Additionally or alternatively, the monitoring device 820, the second monitoring device 850, the monitoring device 860, and/or the master monitoring device 870 includes and/or incorporates one or more components of the system 100. Additionally or alternatively, the monitoring device 820, the second monitoring device 850, the monitoring device 860, and/or the master monitoring device 870 includes and/or incorporates at least a portion of one or more of the remote distress monitor 200 of FIGS. 2-3, the remote distress monitor 400 of FIG. 4, the remote distress monitor 500 of FIG. 5, and the remote distress monitor 600 of FIG. 6.

As such, in some implementations, the monitoring device 820, the second monitoring device 850, the monitoring device 860, and/or the master monitoring device 870 can be the same device, except that certain functionalities of the device can be enabled and/or disabled based at least in part on the user associated with the device. For example, in some implementations, the master monitoring device 870 used by the monitoring personnel 890 does not generate sound data by its steerable microphone array, does not generate a token, and/or does not generate an alert; whereas the monitoring device 820 used by the individual 810 does not perform further analysis beyond generating the alert 830.

CONCLUSION

One or more elements or aspects or steps, or any portion(s) thereof, from one or more of any of claims 1-20 below can be combined with one or more elements or aspects or steps, or any portion(s) thereof, from one or more of any of the other claims 1-20 or combinations thereof, to form one or more additional implementations and/or claims of the present disclosure.

While various examples of the present disclosure have been described above, it should be understood that they have been presented by way of example only, and not limitation. Numerous changes to the disclosed examples can be made in accordance with the disclosure herein without departing from the spirit or scope of the disclosure. Thus, the breadth and scope of the present disclosure should not be limited by any of the above described examples. Rather, the scope of the disclosure should be defined in accordance with the following claims and their equivalents.

Although the disclosure has been illustrated and described with respect to one or more implementations, equivalent alterations and modifications will occur to others skilled in the art upon the reading and understanding of this specification and the annexed drawings. In addition, while a particular feature of the disclosure may have been disclosed with respect to only one of several implementations, such feature may be combined with one or more other features of the other implementations as may be desired and advantageous for any given or particular application.

The terminology used herein is for the purpose of describing particular examples only and is not intended to be limiting of the disclosure. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this disclosure belongs. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A remote distress monitor comprising:
a steerable microphone array configured to detect audio data and generate sound data;
a memory storing machine-readable instructions; and
a control system including one or more processors configured to execute the machine-readable instructions to:
analyze the generated sound data to recognize a distress sound;
based at least in part on the analysis, generate a unique token associated with the audio data detected by the steerable microphone array, the audio data being representative of one or more sounds associated with a distress event;
add the unique token as a preamble to an outbound compressed voice/sound stream that is serialized and/or compressed from the detected audio data; and
transmit, via a communications network, the compressed voice/sound stream and the unique token to an electronic device to cause a distress response action to occur, the distress response action being associated with the distress event,
wherein the distress response action includes recording an IP address associated with a location of the steerable microphone array and displaying the location of the steerable microphone array.

2. The remote distress monitor of claim 1, wherein the steerable microphone array is physically fixed relative to a housing of the remote distress monitor.

3. The remote distress monitor of claim 1, wherein at least portions of the steerable microphone array, the memory, and the control system are positioned within a housing of the remote distress monitor.

4. The remote distress monitor of claim 1, wherein the microphone array includes a plurality of microphones and an adaptive amplitude and phasing circuit.

5. The remote distress monitor of claim 4, wherein the adaptive amplitude and phasing circuit of the microphone array is configured to generate the sound data based at least in part on adjusting an amplitude of the audio data, a phase of the audio data, or both.

6. The remote distress monitor of claim 1, wherein the electronic device is external to the remote distress monitor.

7. The remote distress monitor of claim 1, wherein the electronic device includes a speaker of the remote distress monitor.

8. The remote distress monitor of claim 7, wherein the distress response action includes playing a sound stream on the speaker, and wherein the sound stream corresponds to a verbal response for the distress event.

9. The remote distress monitor of claim 8, wherein the verbal response for the distress event is associated with a feedback confirming a request for assistance is needed for the distress event.

10. The remote distress monitor of claim 1, wherein the unique token, which is associated with a specific sound and/or a series of sounds, includes a code name, a string of numbers, a unique numeric value, or any combination thereof.

11. The remote distress monitor of claim 1, further comprising a camera, wherein the unique token triggers recording using the camera.

12. The remote distress monitor of claim 1, wherein the generated sound data from the steerable microphone array is not transmitted to the electronic device.

13. The remote distress monitor of claim 1, wherein the electronic device includes a third party server, an emergency call center, or a third party's mobile device.

14. The remote distress monitor of claim 1, wherein the analyzing the generated sound data includes:
receiving predetermined distress sound library data in a distress sound subset of a library, the predetermined distress sound library data including a plurality of predetermined sounds associated with stored distress events; and
comparing the generated sound data from the microphone array to the received predetermined distress sound library data.

15. The remote distress monitor of claim 1, wherein the control system is further configured to:
receive predetermined phoneme library data in a phoneme subset of a library, the predetermined phoneme library data including a plurality of predetermined sounds associated with stored names or words;
based at least in part on the analyzing the generated sound data from the microphone array, convert the generated token to a name or word;
compare the converted token to the received predetermined phoneme library data; and
cause the electronic device to execute the distress response action based at least in part on the comparison.

16. The remote distress monitor of claim 1, wherein the distress response action further includes recording subsequent audio data detected by the steerable microphone array, recording subsequent sound data generated by the steerable microphone array, dispatching an intervention, creating a potential mitigating response, or any combination thereof.

17. A method for remote distress monitoring, the method comprising:
analyzing sound data generated from a steerable microphone array to recognize a distress sound;
based at least in part on the analysis, generating a unique token associated with audio data detected by the steerable microphone array, the audio data being representative of one or more sounds associated with a distress event;
adding the unique token as a preamble to an outbound compressed voice/sound stream that is serialized and/or compressed from the detected audio data; and
transmitting, via a communications network, the compressed voice/sound stream and the unique token to an electronic device to cause a distress response action to occur, the distress response action being associated with the distress event,
wherein the distress response action includes recording an IP address associated with a location of the steerable microphone array and displaying the location of the steerable microphone array.

18. The method of claim 17, further comprising:

receiving predetermined distress sound library data in a distress sound subset of a library, the predetermined distress sound library data including a plurality of predetermined sounds associated with stored distress events; and comparing the generated sound data from the steerable microphone array to the received predetermined distress sound library data.

19. The method of claim 17, further comprising:

receiving predetermined phoneme library data in a phoneme subset of a library, the predetermined phoneme library data including a plurality of predetermined sounds associated with stored names or words;

based at least in part on the analyzing the generated sound data from the steerable microphone array, converting the generated token to a name or word;

comparing the converted token to the received predetermined phoneme library data; and causing the electronic device to execute the distress response action based at least in part on the comparison.

20. The method of claim 17, further comprising transmitting, via the communications network, the generated token to the electronic device without transmitting the generated sound data from the steerable microphone array to the electronic device.

* * * * *